United States Patent
Sugaya

(10) Patent No.: US 7,212,833 B2
(45) Date of Patent: May 1, 2007

(54) METHOD OF CONSTRUCTING RADIO NETWORK RADIO COMMUNICATION SYSTEM, AND RADIO COMMUNICATION APPARATUS

(75) Inventor: Shigeru Sugaya, Kanagawa (JP)

(73) Assignee: Sony Corporation (JP)

( * ) Notice: Subject to any disclaimer, the term of this patent is extended or adjusted under 35 U.S.C. 154(b) by 432 days.

(21) Appl. No.: 10/333,703

(22) PCT Filed: Jun. 5, 2002

(86) PCT No.: PCT/JP02/05560

§ 371 (c)(1),
(2), (4) Date: Jan. 23, 2003

(87) PCT Pub. No.: WO03/001743

PCT Pub. Date: Jan. 3, 2003

(65) Prior Publication Data

US 2003/0157950 A1    Aug. 21, 2003

(30) Foreign Application Priority Data

Jun. 8, 2001    (JP) .............................. 2001-174766

(51) Int. Cl.
    *H04B 7/00*    (2006.01)
(52) U.S. Cl. ....................... 455/519; 455/41.2; 455/518
(58) Field of Classification Search ............... 455/41.2, 455/507, 509, 518–519
See application file for complete search history.

(56) References Cited

U.S. PATENT DOCUMENTS

| | | | |
|---|---|---|---|
| 6,745,038 B2 * | 6/2004 | Callaway et al. | 455/456.1 |
| 6,901,057 B2 * | 5/2005 | Rune et al. | 370/310 |
| 2002/0085503 A1 * | 7/2002 | Hulyalkar et al. | 370/252 |

FOREIGN PATENT DOCUMENTS

| | | | | |
|---|---|---|---|---|
| JP | 61096849 A | * | 5/1986 | |
| JP | 09149061 A | * | 6/1997 | |
| JP | 11146030 A | * | 5/1999 | |
| JP | 2000138685 A | * | 5/2000 | |
| JP | 2000151641 A | * | 5/2000 | |
| JP | 2001007818 A | * | 1/2001 | |

* cited by examiner

Primary Examiner—Edward F. Urban
Assistant Examiner—Raymond S. Dean
(74) Attorney, Agent, or Firm—Lerner, David, Littenberg, Krumholz & Mentlik, LLP

(57) ABSTRACT

A method of constructing a radio network that enables the user to select an arbitrary radio communication apparatus as a control station and the thus selected radio communication apparatus preferentially constructs the radio network, wherein the radio communication apparatus that is desired to be arranged as a control station is set up so that it has the function of preferentially becoming a control station in advance. In case several radio communication apparatuses are designated as control stations, any of the radio communication apparatuses is selected as a control station based on the number of radio communication apparatuses with which the designated radio communication apparatus can communicate.

11 Claims, 8 Drawing Sheets

FIG.3A

|  | SELECTION JUDGMENT VALUE |
|---|---|
| COMMUNICATION APPARATUS A | 2 |
| COMMUNICATION APPARATUS B | 1F |
| COMMUNICATION APPARATUS C | 2F |
| COMMUNICATION APPARATUS D | – |
| COMMUNICATION APPARATUS E | – |

FIG.3B

|  | SELECTION JUDGMENT VALUE |
|---|---|
| COMMUNICATION APPARATUS A | 0 |
| COMMUNICATION APPARATUS B | 3F |
| COMMUNICATION APPARATUS C | 2F |
| COMMUNICATION APPARATUS D | 2 |
| COMMUNICATION APPARATUS E | 2 |

FIG.3C

|  | SELECTION JUDGMENT VALUE |
|---|---|
| COMMUNICATION APPARATUS A | 0 |
| COMMUNICATION APPARATUS B | 1F |
| COMMUNICATION APPARATUS C | 4F |
| COMMUNICATION APPARATUS D | 2 |
| COMMUNICATION APPARATUS E | 2 |

FIG.3D

|  | SELECTION JUDGMENT VALUE |
|---|---|
| COMMUNICATION APPARATUS A | – |
| COMMUNICATION APPARATUS B | 1F |
| COMMUNICATION APPARATUS C | 2F |
| COMMUNICATION APPARATUS D | 3 |
| COMMUNICATION APPARATUS E | 2 |

FIG.3E

|  | SELECTION JUDGMENT VALUE |
|---|---|
| COMMUNICATION APPARATUS A | – |
| COMMUNICATION APPARATUS B | – |
| COMMUNICATION APPARATUS C | 2F |
| COMMUNICATION APPARATUS D | 2 |
| COMMUNICATION APPARATUS E | 2 |

FIG.4A

|  | SELECTION JUDGMENT VALUE |
|---|---|
| COMMUNICATION APPARATUS A | 2 |
| COMMUNICATION APPARATUS B | 3F |
| COMMUNICATION APPARATUS C | 4F |
| COMMUNICATION APPARATUS D | – |
| COMMUNICATION APPARATUS E | – |

FIG.4B

|  | SELECTION JUDGMENT VALUE |
|---|---|
| COMMUNICATION APPARATUS A | 2 |
| COMMUNICATION APPARATUS B | 3F |
| COMMUNICATION APPARATUS C | 4F |
| COMMUNICATION APPARATUS D | 3 |
| COMMUNICATION APPARATUS E | – |

FIG.4C

|  | SELECTION JUDGMENT VALUE |
|---|---|
| COMMUNICATION APPARATUS A | 2 |
| COMMUNICATION APPARATUS B | 3F |
| COMMUNICATION APPARATUS C | 4F |
| COMMUNICATION APPARATUS D | 3 |
| COMMUNICATION APPARATUS E | 2 |

FIG.4D

|  | SELECTION JUDGMENT VALUE |
|---|---|
| COMMUNICATION APPARATUS A | – |
| COMMUNICATION APPARATUS B | 3F |
| COMMUNICATION APPARATUS C | 4F |
| COMMUNICATION APPARATUS D | 3 |
| COMMUNICATION APPARATUS E | 2 |

FIG.4E

|  | SELECTION JUDGMENT VALUE |
|---|---|
| COMMUNICATION APPARATUS A | – |
| COMMUNICATION APPARATUS B | – |
| COMMUNICATION APPARATUS C | 4F |
| COMMUNICATION APPARATUS D | 3 |
| COMMUNICATION APPARATUS E | 2 |

METHOD OF CONSTRUCTING RADIO NETWORK RADIO COMMUNICATION SYSTEM, AND RADIO COMMUNICATION APPARATUS

TECHNICAL FIELD

The present invention relates to a method of constructing a radio network, a radio communication system, and a radio communication apparatus, which can determine an appropriate control station of a radio network composed of a plurality of radio communication apparatuses.

BACKGROUND ART

Conventionally, there have been proposed a variety of radio network systems in which a plurality of radio terminal stations are connected to each other via radio communication lines.

There is proposed a first-type radio network system, in which a control station has been determined in advance and thus previously determined control station manages communication among respective terminal stations. In this case, the control station works as a semipermanently fixed connection point called as an access point, which manages communication among respective terminal stations included in a radio network. Thus, in general, the configuration of the control station being an access point is different from those of other terminal stations.

There is also proposed a second-type radio network system called the ad hoc type radio network. The ad hoc type radio network is composed of a plurality of communication apparatuses which can communicate with each other. There is no specified access point in the ad hoc type radio network, and each of the communication apparatuses included in the radio network can make a connection with other communication apparatuses freely. Each of the communication apparatuses included in the ad hoc type radio network has the function of working as a control station, and all of the communication apparatuses may have the same configuration.

There is further proposed a third-type radio network system which is composed of a plurality of communication apparatuses, in which any of the plural communication apparatuses is caused to have the function of a control station. For example, any of the communication apparatuses is selected as a control station, and thus selected communication apparatus manages transmission resources.

In the first-type radio network system using a control station settled as an access point, it is difficult to construct a network freely since the access point is located at a semipermanently fixed position. For example, it is difficult for a terminal station which is located far away from the control station to enter into the radio network system since the terminal station cannot receive control signals from the control station. Furthermore, in the first-type radio network system, the configuration of the control station as an access point is different from those of other terminal stations. So, it is impossible to utilize a terminal station, other than the control station, as a control station.

Furthermore, in the first-type radio network system, in case of dividing a radio network into two or more radio networks, it is necessary to properly relocate control stations as access points at respective reconstructed radio networks. Also, it is necessary for respective relocated control stations in respective reconstructed radio networks to redo network management such as registration of newly connected terminal stations. Thus, there is undesirably raised complicated processing.

On the other hand, in the second-type radio network system of the ad hoc type, it is difficult to unitarily manage transmission line resources when respective communication apparatuses perform band reservation transmission since there exists no specified control station. Also, it becomes difficult to unitarily manage temporal resources when respective communication apparatuses perform time-division multiplexing transmission.

On the other hand, in the third-type radio network system using any of plural communication apparatuses as a control station, when a communication apparatus is automatically selected as a control station of the radio network, a communication apparatus, not desired by the user, may be selected as a control station since the communication apparatus is selected by simply comparing processing capability of the respective communication apparatuses. In this case, there is raised a problem that a network desired by the user cannot be constructed freely or an undesirable network which the user does not desire may be constructed.

Furthermore, in case there exist several communication apparatuses each of which can work as a control station in a communication space, there are undesirably constructed plural networks, and a problem is raised that one communication apparatus is included in a first network and another communication apparatus is included in a second network.

DISCLOSURE OF THE INVENTION

Accordingly, the present invention has an object to overcome the above-mentioned drawbacks of the prior art by providing a method of constructing a radio network, specifically the ad hoc type radio network composed of a plurality of radio communication apparatuses each of which can work as a control station, which enables the user to select an arbitrary communication apparatus as a control station and thus selected communication apparatus preferentially constructs the radio network.

Also, the present invention provides a radio communication system in which the user can designate a communication apparatus preferentially working as a control station.

Furthermore, the present invention provides a radio communication apparatus which has the function of preferentially working as a control station according to the settings of the user in a radio communication system in which a radio network is constructed using a plurality of communication apparatuses and a control station of the radio network is automatically determined.

Furthermore, the present invention provides a method of constructing a radio network, with which, in case several communication apparatuses are set up to be control stations concurrently, an appropriate control station is determine based on the number of communication apparatuses with which the set up communication apparatus can communicate.

The above object can be attained by providing a radio communication system using a radio network composed of a plurality of radio communication apparatuses each can work as a control station, wherein each of the radio communication apparatuses has the function of cooperatively determining a control station of the radio network, and the radio communication apparatus which is designated as a control station by the user is preferentially selected as a control station.

Also, the above object can be attained by providing a radio communication apparatus for a radio network, including the function of communicating with other radio communication apparatuses to interchange control station selection information, and preferentially becoming a control station according to the settings of the user.

Also, the above object can be attained by providing a radio communication apparatus, including the function of constructing a radio network using a plurality of radio communication apparatuses, communicating with other radio communication apparatuses to select a control station, detecting a radio communication apparatus which preferentially becomes a control station, and becoming a control station in case the number of radio communication apparatuses with which the radio communication apparatus can communicate is large.

Also, the above object can be attained by providing a method of constructing a radio network composed of a plurality of radio communication apparatuses each can work as a control station, including the steps of accepting a designation as a control station from the user by any of the radio communication apparatuses selecting any of the plural radio communication apparatuses as a control station, wherein, in the selection step, the radio communication apparatus which is designated as a control station by the user is preferentially selected as a control station.

Also, the above object can be attained by providing a method of constructing a radio network composed of a plurality of radio communication apparatuses, including the steps of transmitting information for selecting a control station, obtaining the number of radio communication apparatuses to which each of the radio communication apparatuses can make a connection, and selecting any of the plural radio communication apparatuses as a control station.

These objects and other objects, features and advantages of the present invention will become more apparent from the following detailed description of the preferred embodiments of the present invention.

BRIEF DESCRIPTION OF THE DRAWINGS

FIG. 3A to FIG. 3E show storage contents examples of selection judgement values of the respective communication apparatuses at the time when the first-time interchange processing of control station selection information is completed.

FIG. 4A to FIG. 4E show storage contents examples of selection judgement values of the respective communication apparatuses at the time when the second-time interchange processing of control station selection information is completed.

BEST MODE FOR CARRYING OUT THE INVENTION

The radio network system employing the present invention will further be described below concerning the best modes with reference to the accompanying drawings.

Figure 1:
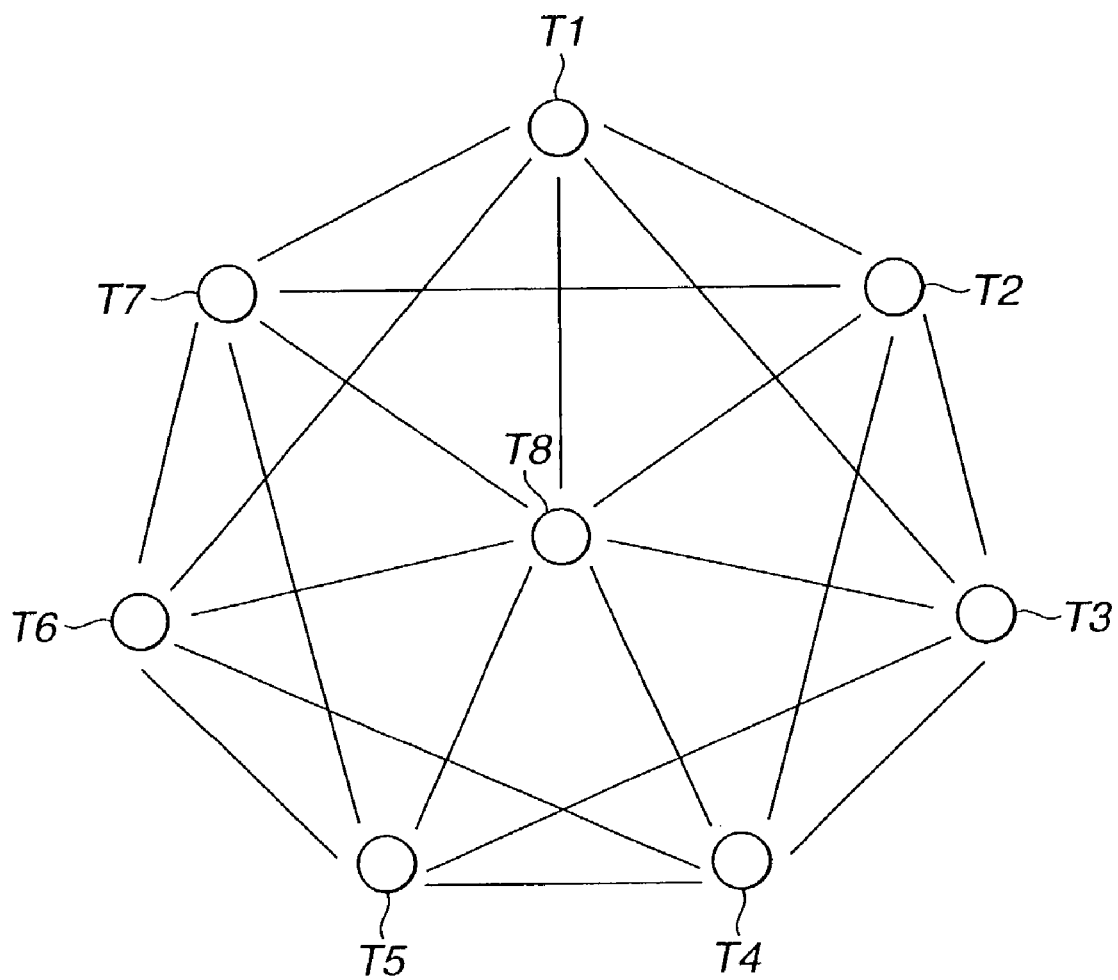
FIG. 1 shows an example of the configuration of the radio network system according to the present invention.

FIG. 1 shows the configuration of the radio network system employing the present invention.

The radio network system employing the present invention is composed of a plurality of radio communication apparatuses T1 to T8, as shown in FIG. 1. Each of the radio communication apparatuses can transmit and receive radio signals in a predetermined transmission system and can also work as a control station of the radio network system.

In FIG. 1, the communication apparatus T8 is selected as a control station of the radio network, and works as a control station. Other communication apparatuses T1 to T7, being terminal stations included in the radio network, transmit and receive radio signals with each other. The communication apparatus T8 is located at a proper position capable of transmitting control signals to all the communication apparatuses T1 to T7, so the communication apparatus T8 is in the state of communicating with the communication apparatuses T1 to T7 easily. The communication apparatus selected as a control station is not restricted to a communication apparatus located at a proper position as a control station, and an arbitrary communication apparatus can be caused to work as a control station by the designation of the user.

In the radio network shown in FIG. 1, each of the communication apparatuses cannot necessarily communicate directly with other all communication apparatuses. For example, the communication apparatus T1 is located relatively close to the communication apparatuses T2, T7, and T8, and thus can transmit radio signals thereto easily without losing information due to attenuation of the radio signals. On the other hand, the communication apparatus T1 is located relatively distant from the communication apparatuses T3 and T6, and thus may occasionally have difficulty in transmitting radio signals thereto. Furthermore, the communication apparatus T1 is located so far away from the communication apparatuses T4 and T5, and thus cannot transmit radio signals directly thereto.

Similarly, each of other communication apparatuses T2 to T7 can transmit radio signals to some of the communication apparatuses, and may occasionally have difficulty in transmitting radio signals to some the communication apparatuses, and cannot transmit radio signals directly to some the communication apparatuses.

Figure 2:
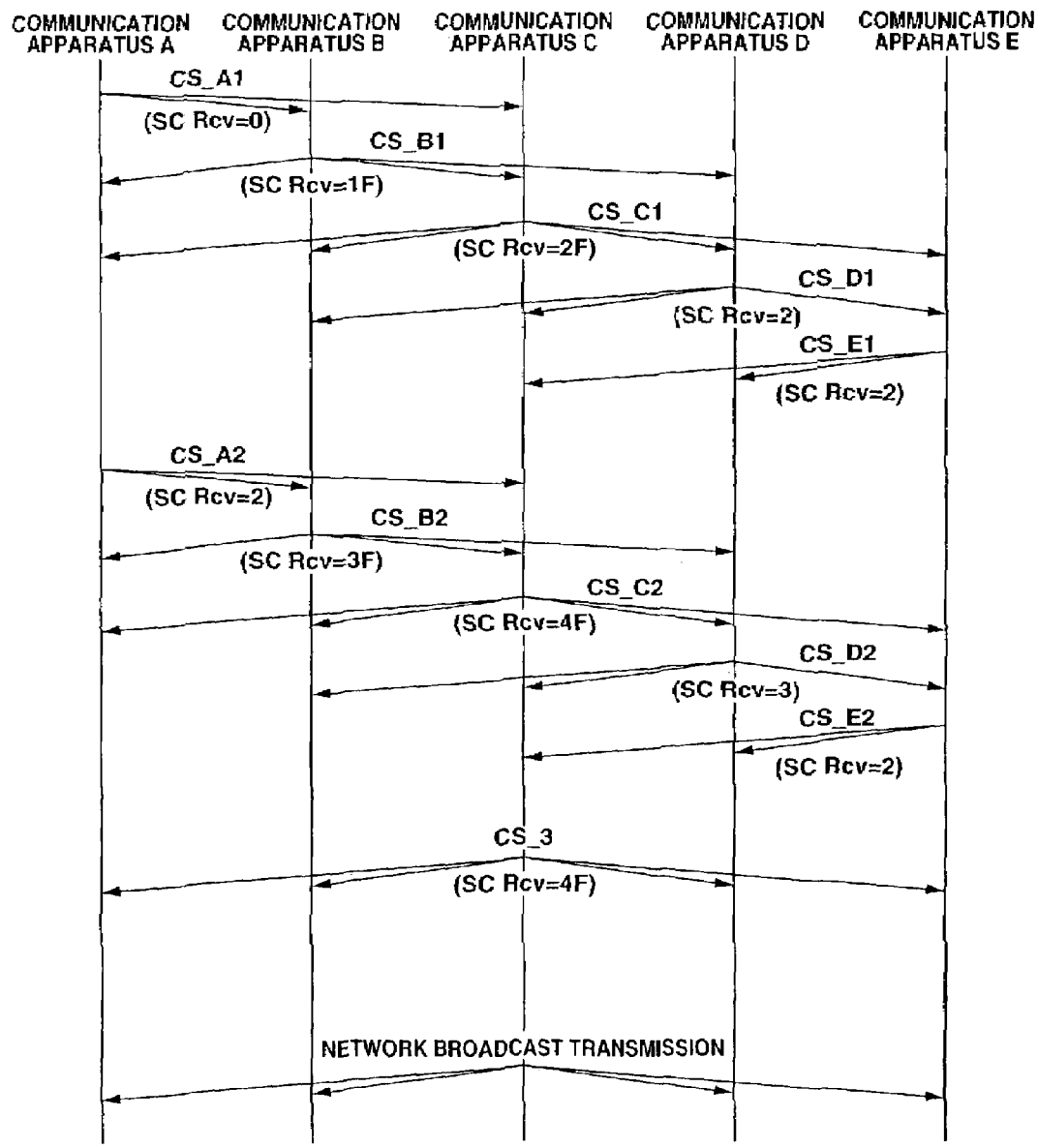
FIG. 2 shows an information interchange sequence for the method of determining a control station in the radio network system.

Next, the method of determining a control station in the radio network employing the present invention will be explained. FIG. 2 shows an information interchange sequence for the method of determining a control station in the radio network system employing the present invention. The radio network system shown in FIG. 2 is composed of five communication apparatuses A to E, and it is assumed that the user has already selected the two communication apparatuses B and C as control stations. It will be described later how the user selects these communication apparatuses as control stations.

In the method of determining a control station employing the present invention, there is a first-time interchange processing of control station selection information, a second-time interchange processing of control station selection information, and a processing for determining and notifying a control station.

In the first-time interchange processing of control station selection information, predetermined information is transmitted and received among communication apparatuses constituting the radio network system. Also, in the second-time interchange processing of control station selection information, similar to the first-time interchange processing, predetermined information is transmitted and received among communication apparatuses constituting the radio network system.

Then, in the processing for determining and notifying a selected control station, each of the communication apparatuses judges whether or not the communication apparatus itself is optimum as a control station. Then, one of the communication apparatuses, which judges itself to be optimum as a control station, notifies other communication apparatuses that the communication apparatus itself is to be selected as a control station. Then, the communication apparatus transmits network broadcast transmission and sets up a predetermined frame frequency, and thus a radio network is constructed.

Next, the first-time interchange processing of control station selection information will be explained in detail.

The initiation operation of the communication apparatus A will be explained with reference to FIG. 2, in which case the communication apparatuses B to E have been already operated. As shown in FIG. 2, the communication apparatus A is located at a position capable of communicating with only the communication apparatuses B and C, the communication apparatus B is located at a position capable of communicating with only the communication apparatuses A, C, and D, the communication apparatus C is located at a position capable of communicating with all the other communication apparatuses A, B, D, and E, the communication apparatus D is located at a position capable of communicating with only the communication apparatuses B, C, and E, and the communication apparatus E is located at a position capable of communicating with only the communication apparatuses C and D. Also, the communication apparatuses B, C are designated as control stations by the user.

Firstly, when the communication apparatus A is initiated, the communication apparatus A transmits a first-time control station selection information signal CS_A1.

The control station selection information signal has an identifier indicating that the signal is a control station selection information signal, an identifier for specifying the communication apparatus being the transmission source, an MAC address of the communication apparatus, and a selection judgement value SC_Rcv used when judging selection of a control station. The selection judgement value SC_Rcv has the number of the control station selection information signals that the communication apparatus receives from other communication apparatuses and information indicating whether or not the communication apparatus is selected as a control station by the user. In the present invention, the selection judgement value SC_Rcv is represented as "0", "1F", etc., where the "0" indicates that the communication apparatus has received no control station selection information signal from other communication apparatuses and is not selected as a control station by the user, while the "1F" indicates that the communication apparatus has received one control station selection information signal from other communication apparatuses and is selected as a control station by the user.

The selection judgement value SC_Rcv included in the control station selection information signal CS_A1 is transmitted as "SC_Rcv=0" since the communication apparatus A has received no control station selection information signal from other communication apparatuses and is not selected as a control station by the user.

As has been described above, in view of the locations of the respective communication apparatuses, the control station selection information signal CS_A1 transmitted from the communication apparatus A reaches the communication apparatuses B and C, and does not reach the communication apparatuses D and E.

Next, the communication apparatus B which receives the control station selection information signal CS_A1 from the communication apparatus A similarly transmits a first-time control station selection information signal CS_B1. At this time, the communication apparatus B transmits the control station selection information signal CS_B1 with the selection judgement value being "SC-Rcv=1F" since the communication apparatus B has received the control station selection information signal CS_A1 from the communication apparatus A and is preferentially set to be a control station. The first-time control station selection information signal CS_B1 transmitted from the communication apparatus B reaches the communication apparatuses A, C, and D, and does not reach the communication apparatus E.

Next, the communication apparatus C which receives the control station selection information signal CS_A1 from the communication apparatus A and the control station selection information signal CS_B1 from the communication apparatus B similarly transmits a first-time control station selection information signal CS_C1. At this time, the communication apparatus C transmits the control station selection information signal CS_C1 with the selection judgement value being "SC—Rcv=2F" since the communication apparatus C has received the control station selection information signal CS_A1 from the communication apparatus A and the control station selection information signal CS_B1 from the communication apparatus B, and is preferentially set to be a control station. The first-time control station selection information signal CS_C1 transmitted from the communication apparatus C reaches all the communication apparatuses A, B, D, and E.

Next, the communication apparatus D similarly transmits a first-time control station selection information signal CS_D1. At this time, the communication apparatus D transmits the control station selection information signal CS_D1 with the selection judgement value being "SC_Rcv=2" since the communication apparatus D has received the control station selection information signal CS_B1 from the communication apparatus B and the control station selection information signal CS_C1 from the communication apparatus C, and is not preferentially set to be a control station. The first-time control station selection information signal CS_D1 transmitted from the communication apparatus D reaches the communication apparatuses B, C, and E, and does not reach the communication apparatus A.

Next, the communication apparatus E similarly transmits a first-time control station selection information signal CS_E1. At this time, the communication apparatus E transmits the control station selection information signal CS_E1 with the selection judgement value being "SC_Rcv=2" since the communication apparatus E has received the control station selection information signal CS_C1 from the communication apparatus C and the control station selection information signal CS_D1 from the communication apparatus D, and is not preferentially set to be a control station. The first-time control station selection information signal CS_E1 transmitted from the communication apparatus E reaches the communication apparatuses C and D, and does not reach the communication apparatuses A and B.

Thus, the first-time interchange processing of control station selection information is completed.

Each of the communication apparatuses operates so as to store selection judgement values of the respective communication apparatuses. FIG. 3A to FIG. 3E show storage contents examples of selection judgement values of the respective communication apparatuses at the time when the first-time interchange processing of control station selection information is completed. FIG. 3A to FIG. 3E show storage contents examples of such selection judgement values of the communication apparatus A to E. Each of the communication apparatuses store its selection judgement value, and obtain selection judgement values included in control station selection information signals from other communication apparatuses to store thus obtained selection judgement values corresponding to the respective communication apparatuses. For example, in the storage contents of the communication apparatus A shown in FIG. 3A, selection judgement value of the communication apparatus A is "2", selection judgement value of the communication apparatus B is "1F", selection judgement value of the communication apparatus C is "2F", and selection judgement values of the communication apparatuses D and E are unidentified, that is, no control station selection information signal has been received. As for other communication apparatus B to E, similarly, each of the communication apparatuses store its selection judgement value, and obtain selection judgement values included in control station selection information signals from other communication apparatuses to store thus obtained selection judgement values corresponding to the respective communication apparatuses. FIG. 3B to FIG. 3E show thus obtained storage contents examples. Each of the communication apparatuses counts control station selection information signals from other communication apparatus after transmitting its control station selection information signal to manage its selection judgement value. For example, when transmitting the control station selection information signal CS_A1, the selection judgement value SC_Rcv of the communication apparatus A is "0". Then, after receiving control station selection information signals CS_B1 and CS_C1 from the communication apparatuses B and C and count them, the communication apparatus A stores the selection judgement value being "SC_Rcv=2".

Next, the second-time interchange processing of control station selection information following the first-time interchange processing of control station selection information will be explained with reference to FIG. 2.

The second-time interchange processing of control station selection information is performed after the first-time interchange processing of control station selection information is completed and a predetermined period has lapsed. The predetermined period is a sufficient period for all the communication apparatuses to transmit control station selection information signals and receive thus transmitted control station selection information signals.

Firstly, the communication apparatus A transmits a second-time control station selection information signal CS_A2. At this time, the communication apparatus A includes the selection judgement value being "SC_Rcv=2" by adding the first-time control station selection information signals CS_B1 and CS_C1 from the communication apparatuses B and C, as shown in FIG. 3A. Similar to the first-time interchange processing of control station selection information, the control station selection information signal CS_A2 from the communication apparatus A is transmitted to the communication apparatuses B and C, and is not transmitted to the communication apparatuses D and E.

Next, the communication apparatus B which receives the control station selection information signal CS_A2 from the communication apparatus A similarly transmits a second-time control station selection information signal CS_B2. At this time, the SC_Rcv becomes "3F" since the communication apparatus B receives and counts the first-time control station selection information signal CS_D1 from the communication apparatus D, as shown in FIG. 3B. The control station selection information signal CS_B2 including the selection judgement value is transmitted to the communication apparatuses A, C, and D, and is not transmitted to the communication apparatus E.

Next, the communication apparatus C which receives the control station selection information signal CS_A2 from the communication, apparatus A and the control station selection information signal CS_B2 from the communication apparatus B similarly transmits a second-time control station selection information signal CS_C2. At this time, the SC_Rcv becomes "4F" since the communication apparatus C receives and counts the control station selection information signals CS_D1 and CS_E1 from the communication apparatuses D and E, as shown in FIG. 3C. The control station selection information signal CS_C2 including the selection judgement value is transmitted to all the communication apparatuses A, B, D, and E.

Next, the communication apparatus D which receives the control station selection information signal CS_B2 from the communication apparatus B and the control station selection information signal CS_C2 from the communication apparatus C similarly transmits a second-time control station selection information signal CS_D2. At this time, the SC_Rcv becomes "3" since the communication apparatus D receives and counts the first-time control station selection information signal CS_E1 from the communication apparatus E, as shown in FIG. 3D. The control station selection information signal CS_D2 including the selection judgement value is transmitted to the communication apparatuses B, C, and E, and is not transmitted to the communication apparatus A.

Next, the communication apparatus E which receives the control station selection information signal CS_C2 from the communication apparatus C and the control station selection information signal CS_D2 from the communication apparatus D similarly transmits a second-time control station selection information signal CS_E2. At this time, the SC_Rcv remains "2", as shown in FIG. 3E. The control station selection information signal CS_E2 including the selection judgement value is transmitted to the communication apparatuses C and D, and is not transmitted to the communication apparatuses A and B.

Thus, the second-time interchange processing of control station selection information is completed.

Each of the communication apparatuses operates so as to store selection judgement values of other communication apparatuses, and does not operate to count control station selection information signals from other communication apparatuses so as to update its selection judgement value. FIG. 4A to FIG. 4E show storage contents examples of selection judgement values of the respective communication apparatuses at the time when the second-time interchange processing of control station selection information is completed. FIG. 4A to FIG. 4E show storage contents examples of such selection judgement values of the communication apparatus A to E. Each of the communication apparatuses store its selection judgement value, and obtain selection judgement values included in control station selection information signals from other communication apparatuses to store thus obtained selection judgement values corresponding to the respective communication apparatuses. The storage contents of the respective communication apparatuses coincide with each other except the case in which the selection judgement value is unidentified, as shown in FIG. 4A to FIG. 4E, and this indicates the selection judgement values of the respective communication apparatuses when the second-time interchange processing of control station selection information is completed.

Next, the processing for determining and notifying a control station following the second-time interchange processing of control station selection information will be explained.

Each of the communication apparatuses judges whether or not its selection judgement value is greater than those of other communication apparatuses. The processing is completed if the selection judgement value of the communication apparatus is not greater than those of other communication apparatuses, and the communication apparatus operates as a control station if its selection judgement value is greater than those of other communication apparatuses and notifies other communication apparatuses that the communication apparatus itself is to work as a control station.

In the examples shown in FIG. 2 to FIG. 4, since the selection judgement value "4F" of the communication apparatus C is greatest, the communication apparatus C judges itself to be a control station, and other communication apparatuses A, B, D, and E stand by as general communication stations to receive notice from the control station.

The communication apparatus C transmits a notice signal CS_3 of selection of a control station after a predetermined period has lapsed. Then, the communication apparatus transmits network broadcast transmission and sets up a predetermined frame frequency.

Figure 5:
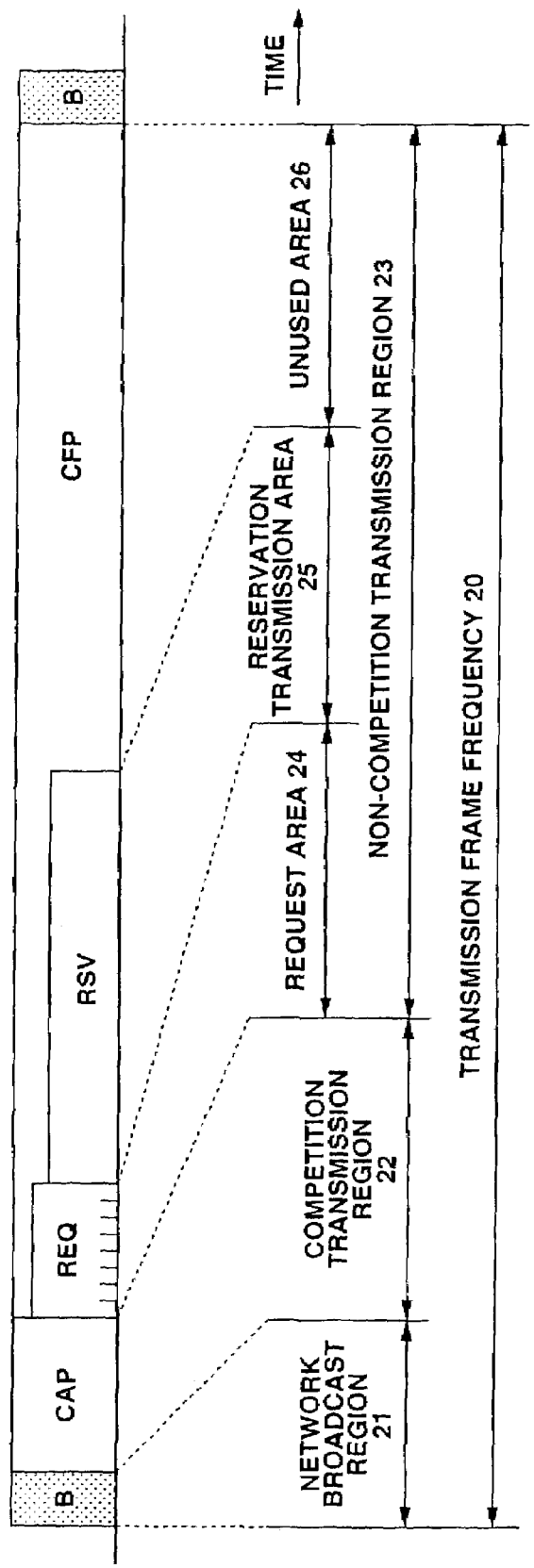
FIG. 5 shows an example of the frame configuration set up by a control station.

FIG. 5 shows an example of the frame configuration set up by a control station. As shown in FIG. 5, a transmission frame frequency 20 is composed of a network broadcast region 21 arranged at the head of the frame which is to be broadcasted and transmitted to a network from the control station, a competition transmission region 22 for performing entrance processing into a network, a non-competition transmission region 23 for transmitting information after respective communication apparatuses perform band reservation. The transmission frame frequency 20 corresponds to a region from the beginning of the network broadcast region 21 to the end of the non-competition transmission region 23.

Furthermore, the non-competition transmission region 23 may have a request area 24 for transmitting a reservation transmission request, a reservation transmission area 25 for transmitting a band reservation, and an unused area 26 which is not used for transmission.

The frame configuration shown in FIG. 5 is an example, and the frame configuration used in the radio network system employing the present invention is not restricted to such frame configuration.

Next, the configuration of the radio communication apparatus employing the present invention will be explained.

Figure 6:
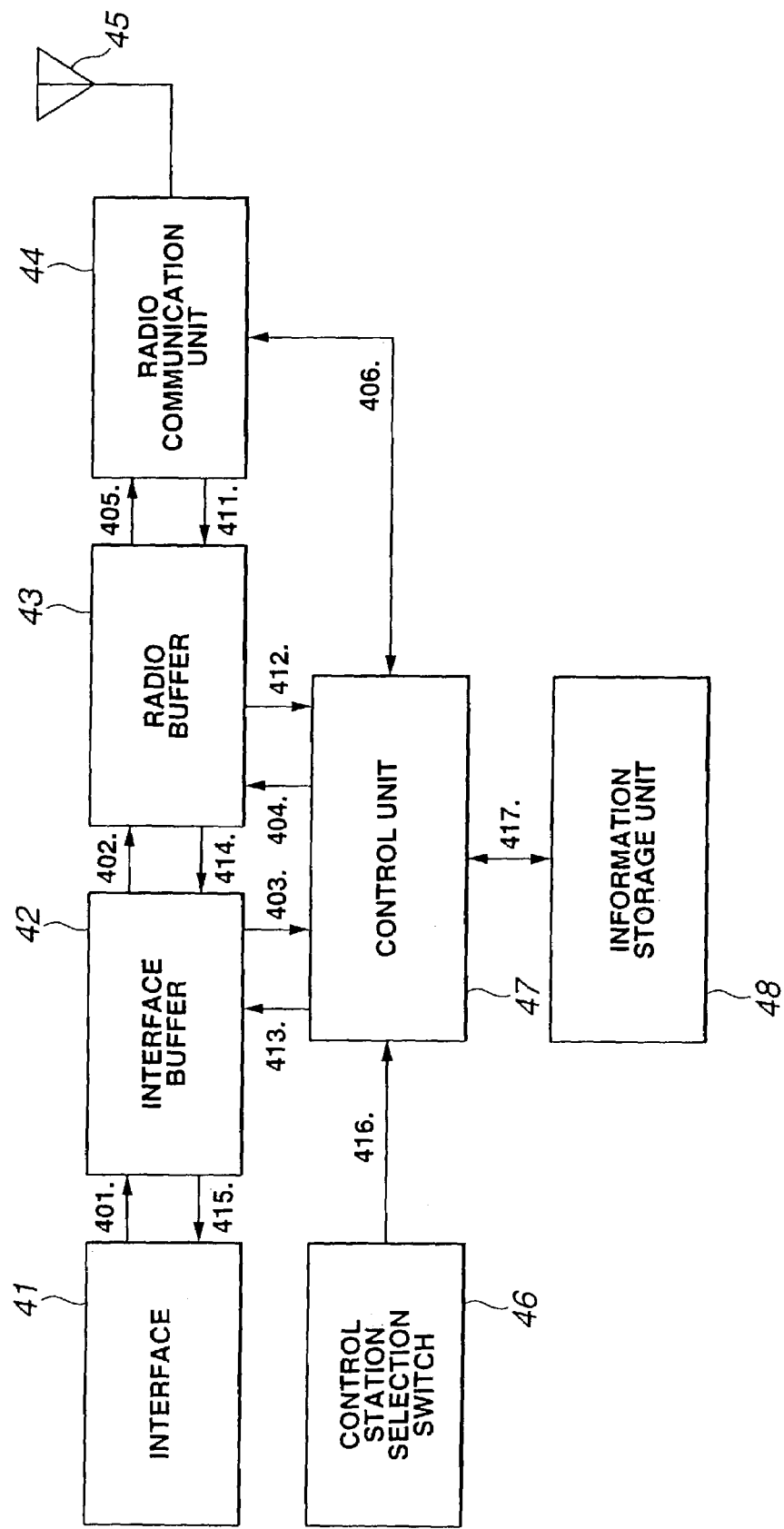
FIG. 6 shows a block diagram of the radio communication apparatus according to the present invention.

FIG. 6 shows a block diagram of the radio communication apparatus employing the present invention.

The radio communication apparatus includes an interface 41, an interface buffer 42 connected to the interface 41, a radio buffer 43 connected to the interface buffer 42, a radio communication unit 44 connected to the radio buffer 43, an antenna 45 connected to the radio communication unit 44, a control unit 47 connected to the interface buffer 42, the radio buffer 43, and the radio communication unit 44, an information storage unit 48 connected to the control unit 47, and a control station selection switch 46 connected to the control unit 47.

The interface 41 connects the radio communication apparatus: to various external peripheral equipments, not show, such as an information processing apparatus or a personal computer, a video apparatus or a monitor, a television receiver, etc., an audio apparatus, and a printer.

The interface buffer 42 stores media information 401 sent from the external peripheral equipments via the interface 41, and thus such information can be stored therein.

The radio buffer 43 forms radio transmission packets using information 402 sent from the interface buffer 42, and sends thus formed radio transmission packets to the radio communication unit 44.

The control unit 47 controls processing of the communication apparatus such as transmission and reception of information, selection of a control station, etc.

The radio communication unit 44 converts radio transmission packets sent from the radio buffer 43 to radio transmission signals of a predetermined radio transmission system, and sends thus generated radio transmission signals to the antenna 45. Also, the radio communication unit 44 decodes radio information signals received by the antenna 45 under the predetermined radio transmission system, and sends thus generated decoded signals to the radio buffer 43.

The predetermined radio transmission system can be of any type so long as it is appropriate for the radio LAN configuration, and may be the ultra wide band communication system. The ultra wide band communication system is a radio communication system using the ultra wide band (UWB) signals.

Under the ultra wide band communication system, on the one hand, an information transmission apparatus multiplies transmission information data by predetermined code series to generate diffused information data, and generates a short impulse with a period of several hundred picoseconds. Then, an impulse signal is generated by causing the phase or subtle temporal variation of the impulse to vary in accordance with the diffused information data, and thus generated impulse signal is used as a transmission signal. On the other hand, an information reception apparatus identifies information bits of the impulse signal using the phase or subtle temporal variation of the impulse, and performs inverse diffusion for the information bits using the predetermined code series to obtain desired information bits. The ultra wide band communication system (ultra wide band transmission system) performs baseband transmission using, basically, signals consisting of pulse strings of an extremely small pulse width not more than 1 ns (nanosecond). Also, the occupied bandwidth of the ultra wide band communication system is of the order of GHz where the occupied bandwidth divided by the center frequency of 1 GHz to 10 GHz becomes approximately 1, and is much broader as compared with that used in radio LAN employing the W-CDMA system, the CDMA 2000 system, the SS (Spread Spectrum), or the OFDM (Orthogonal Frequency Division Multiplexing).

In transmitting radio signals, the control unit 47 controls the interface buffer 42, the radio buffer 43, and the radio communication unit 44. In case it is necessary to perform band reservation transmission in accordance with notice 403 of radio transmission, reservation request 404 is stored in the radio buffer 43 for radio transmission. Then, reservation request 405 inserted into radio transmission packets addressed to a control station using a predetermined request area is sent to the radio communication unit 44, and is transmitted from the antenna 45 as radio signals of a predetermined radio transmission system.

On the other hand, in receiving radio signals, the antenna 45 receives radio signals, and thus received radio signals are sent to the radio communication unit 44. Then, the radio communication unit 44 decodes the radio signals, and sends thus decoded signals 411 to the radio buffer 43. In case the signals sent to the radio buffer 43 are network broadcast information sent periodically from a control station, the network broadcast information 412 is sent to the control unit 47.

The control unit 47 confirms band allocation information of corresponding reservation of its control station, and sets up the radio communication unit 44 in accordance with the band allocation information, and radio transmission packets stored in the radio buffer 43 are transmitted.

In the reception processing, in case designation of reception is performed in the network broadcast information 412 from the control station, the control unit 47 controls the radio communication unit 44 in accordance with the designation, and receives signals with a predetermined timing. Thus received information 411 is stored in the radio buffer 43. Furthermore, the control unit 47 reconstructs reception information 414 in accordance with instruction 404 of frame period unit, and sends the reception information 414 to the interface buffer 42. Then, the control unit 47 sends the information to external peripheral equipments, not shown, as information 415 of a predetermined interface format via the interface 41.

In the communication apparatus, there is provided the control station selection switch 46. When the user performs predetermined operations using the control station selection switch 46, signal.416 which indicates that the communication apparatus is selected as a control station is sent to the control unit 47 after turning on the communication apparatus and when selecting a control station. The control unit 47 performs the processing for selecting a control station based on the signal 416. That is, after turning on the communication apparatus, flow processing for turning on the power thereof is performed under the instruction of the control unit 47. Then, the interchange processing of control station selection information is performed under the flow processing for selecting a control station, and a control station of a radio network is determined.

The control unit 47 sends control station selection information signal 406 to the radio communication unit 44, and transmits the control station selection information signal 406 from the antenna 45. Also, control station selection information signal 406 received by the antenna 45 is sent to the radio communication unit 44, and the radio communication unit 44 sends the control station selection information signal 406 to the control unit 47.

This processing is performed under the instruction of the control unit 47. The information storage unit 48 which stores such various transmission control (transmission and reception control) programs, programs for selecting a control station, control information, etc. is connected to the control unit 47.

Next, the operation of the communication apparatus will be explained.

Figure 7:
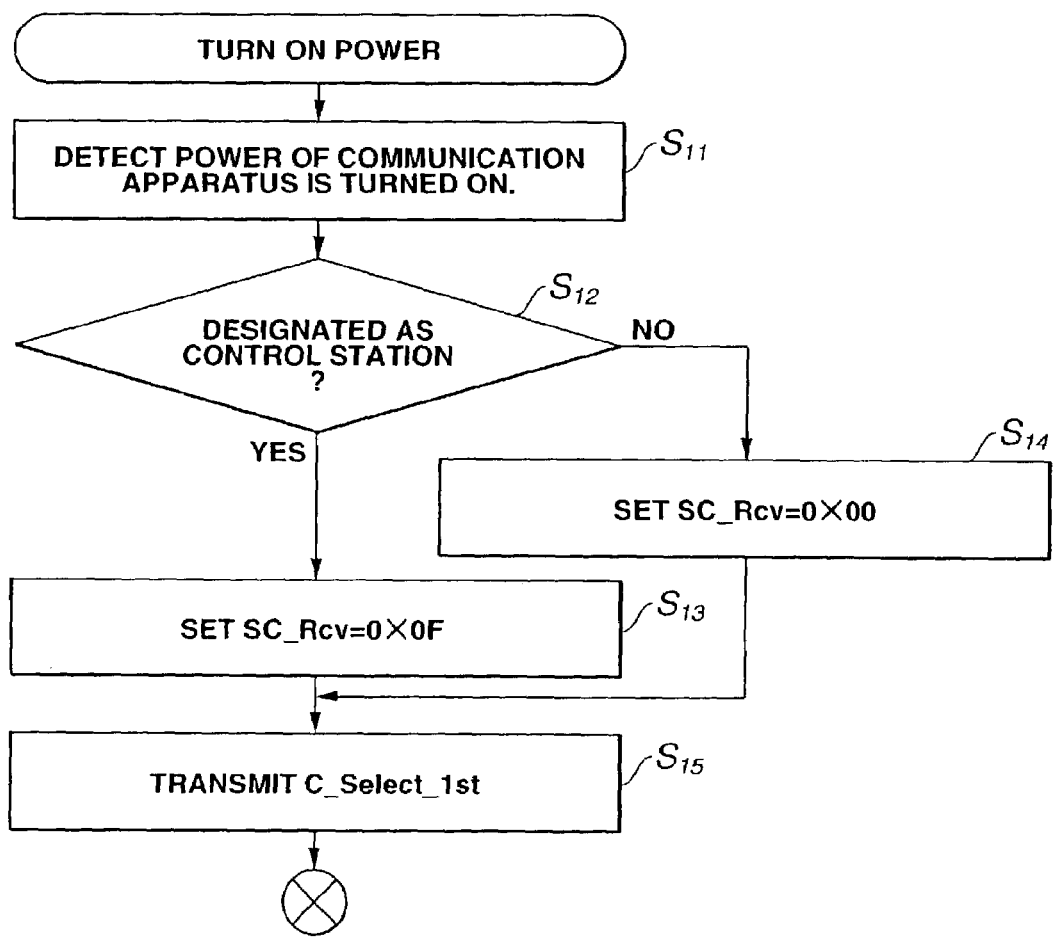
FIG. 7 shows a flow chart for explaining the operation of the radio communication apparatus after turning on the power.

FIG. 7 shows a flow chart for explaining the operation of the radio communication apparatus after turning on the power.

In step $S_{11}$, the communication apparatus detects that the power thereof is turned on. Then, in step $S_{12}$, the communication apparatus judges whether or not the communication apparatus itself has been designated as a control station from the state of its control station selection switch.

In case the communication apparatus itself has been designated as a control station, in step $S_{13}$, the SC_Rcv of the control station selection information is set to be 0F.

In case the communication apparatus itself has not been designated as a control station, in step $S_{14}$, the SC_Rcv of the control station selection information is set to be 0.

In the respective cases, in step $S_{15}$, the communication apparatus transmits a first-time control station selection (C_Select__1st). The "C_Select__1st" indicates CS_X1, where the X is any of A to E.

Figure 8:
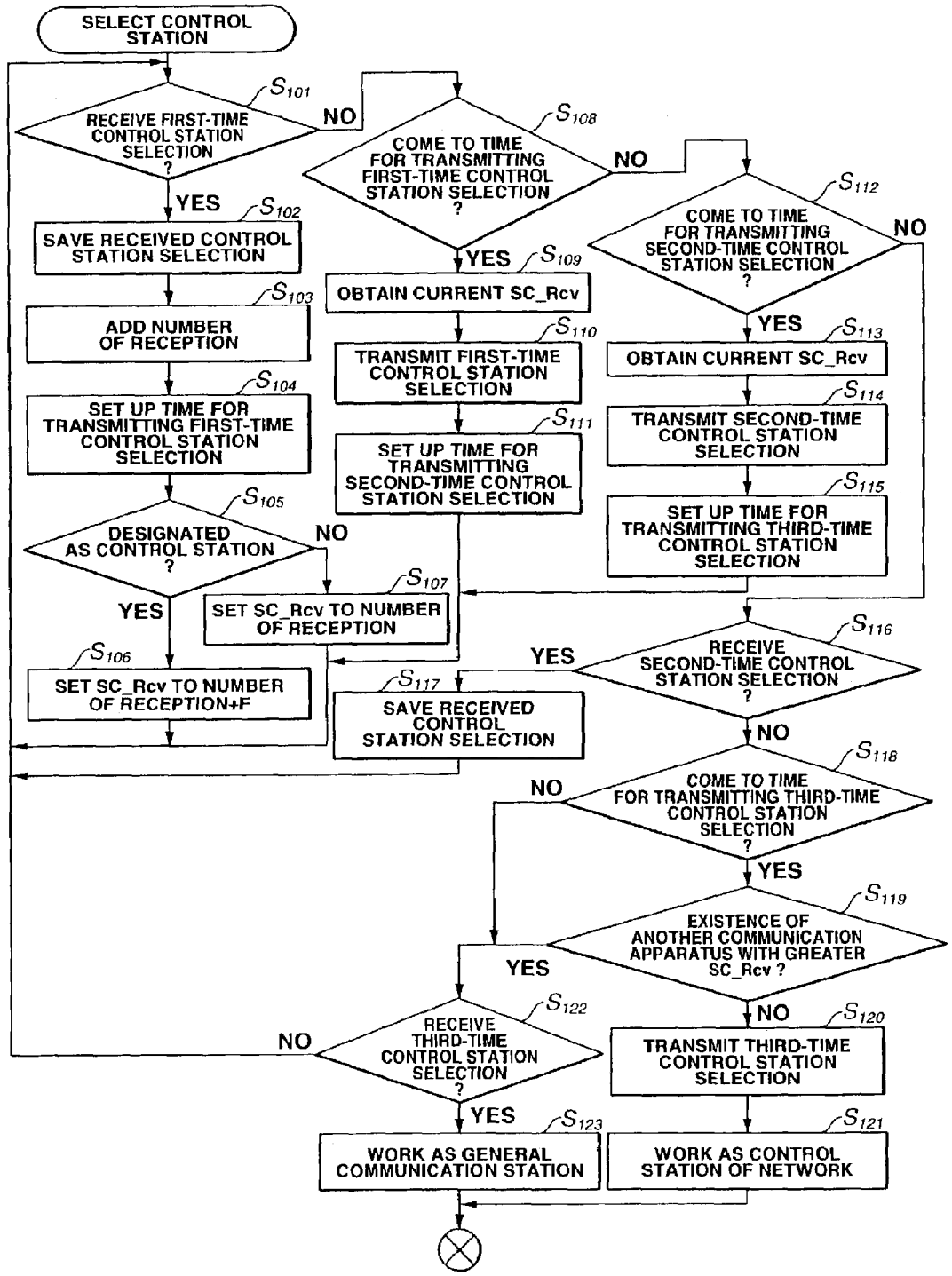
FIG. 8 shows a flow chart for explaining the operation of selecting a control station.

FIG. 8 shows a flow chart for explaining the operation of selecting a control station.

In the following explanation of the flow chart, the operation of communication apparatuses other than that which transmits the first-time control station selection is described. On the other hand, the communication apparatus, which transmits the first-time control station selection, transmits and receives a second-time control station selection and further control station selection in accordance with the operation.

In step $S_{101}$, the communication apparatus detects that it has received the first-time control station selection. Then in step $S_{102}$, the communication apparatus saves thus received control station selection, and then in step $S_{103}$, the communication apparatus adds the number of reception of the first-time control station selection to the number of reception thereof which has already been received.

In step $S_{104}$, the communication apparatus sets up the time for transmitting the first-time control station selection, then in step $S_{105}$, the communication apparatus judges whether or not the communication apparatus itself is designated as a control station from the state of its control station selection switch. In case the communication apparatus itself is designated as a control station, in step $S_{106}$, the SC_Rcv of the control station selection information is set to be the number of reception of the first-time control station selection which has already been received +F.

In case the communication apparatus itself is not designated as a control station, in step $S_{107}$, the SC_Rcv of the control station selection information is set to be the number of reception of the first-time control station selection which has already been received.

In the respective cases, returning to step $S_{101}$, the communication apparatus come into standby state to receive the first-time control station selection (C_Select__1st) transmitted from other communication apparatuses.

In step $S_{101}$, in case the communication apparatus judges that it has not received the first-time control station selection, transferring to step $S_{108}$, the communication apparatus judges whether or not it comes to the time for transmitting the first-time control station selection. In case it comes to the time for transmitting the first-time control station selection, in step $S_{109}$, the communication apparatus obtains current SC_Rcv, then in step $S_{110}$, the communication apparatus transmits the first-time control station selection (C_Select__1st).

In step $S_{111}$, the communication apparatus sets up the time for transmitting the second-time control station selection, returning to step $S_{101}$.

In step $S_{108}$, in case the communication apparatus judges that it does not come to the time for transmitting the first-time control station selection, transferring to step $S_{112}$, the communication apparatus judges whether or not it comes to the time for transmitting the second-time control station selection.

In case it comes to the time for transmitting the second-time control station selection, in step $S_{113}$, the communication apparatus obtains current SC_Rcv, then in step $S_{114}$, the communication apparatus transmits the second-time control station selection (C_Select_2nd). The "C_Select_2nd" indicates CS_X2, where the X is any of A to E.

In step $S_{115}$, the communication apparatus sets up the time for transmitting the third-time control station selection, returning to step $S_{101}$.

In step $S_{112}$, in case the communication apparatus judges that it does not come to the time for transmitting the second-time control station selection, transferring to step $S_{116}$, the communication apparatus judges whether or not it has received the second-time control station selection.

In step $S_{116}$, in case the communication apparatus receives the second-time control station selection, then in step $S_{117}$, the communication apparatus saves the SC_Rcv written in thus received control station selection, returning to step $S_{101}$.

In step $S_{116}$, in case the communication apparatus judges that it has not received the second-time control station selection, transferring to step $S_{118}$, the communication apparatus judges whether or not it comes to the time for transmitting the third-time control station selection.

In case it comes to the time for transmitting the third-time control station selection, in step $S_{119}$, the communication apparatus examines the existence of another communication apparatus whose SC_Rcv is greater than that of the communication apparatus itself.

In step $S_{119}$, in case the communication apparatus judges that there is no communication apparatus whose SC_Rcv is greater than that of the communication apparatus itself, then in step $S_{120}$, the communication apparatus transmits the third-time control station selection. Then, in step $S_{121}$, the communication apparatus works as a control station of the network to which the communication apparatus itself belongs, terminating the processing.

In case the communication apparatus judges that it does not come to the time for transmitting the third-time control station selection in step $S_{118}$, and in case the communication apparatus judges that there exists another communication apparatus whose SC_Rcv is greater than that of the communication apparatus itself in step $S_{119}$, in step $S_{122}$, the communication apparatus judges whether or not it has received the third-time control station selection.

In step $S_{122}$, in case the communication apparatus judges that it has not received the third-time control station selection, the processing returns to step $S_{101}$. On the other hand, in case the communication apparatus judges that it has received the third-time control station selection, in step $S_{123}$, the communication apparatus works as a general communication station, terminating the processing.

According to the preset invention, there can be provided a radio network in which a radio communication apparatus designated by the user can work as a control station.

Also, the user can easily designate a control station by providing a switch means to preferentially become a control station of a radio network.

Furthermore, according to the present invention, in case two or more radio communication apparatuses are designated as control stations, a radio communication apparatus, optimum as a control station, works as the control station according to the connection state of a radio network without constructing several radio networks undesired by the user.

According to the radio network system employing the present invention, a new radio communication apparatus can freely enter into a radio network and a radio communication apparatus can freely withdraw from a radio network.

Also, there can be realized a radio communication system capable of constructing a radio network freely by providing a switch means to preferentially become a control station of the radio network and providing a process of working as a control station of the radio network so long as the switch means is provided.

Furthermore, even though there exist a plurality of radio communication apparatuses provided with the switch means, a radio communication apparatus located at the center of a radio network can be designated as a control station by providing a process of selecting an optimum control station based on the number of communicable radio communication apparatuses.

According to the radio communication apparatus employing the present invention, there can be realized a radio communication apparatus enabling the user to easily designate a control station by providing a switch means to preferentially become a control station of a radio network.

Also, a radio communication apparatus located at the center of a radio network can be designated as a control station even though there exist a plurality of radio communication apparatuses each provided with a switch means to preferentially become a control station of the radio network.

In the above-described embodiment, there is provided a radio network system in which a radio communication apparatus selected by the user using a switch means preferentially becomes a control station. On th ether hand, there may be configured a radio network system in which a radio communication apparatus can be freely selected as a control station to construct the radio network without selecting a radio communication apparatus by the user.

With such configuration, a radio communication apparatus is not provided with a switch means since the user does not select a control station. It is not necessary to provide a value "1F" indicating that a radio communication apparatus is selected as a control station by the user as a selection judgement value, and a control station is determined by the number of a selection judgement value (the number of communicable communication apparatuses). Other than this, the configuration is similar to that explained before.

INDUSTRIAL APPLICABILITY

According to the preset invention, there can be provided a radio network in which a radio communication apparatus designated by the user can work as a control station.

Furthermore, according to the present invention, in case two or more radio communication apparatuses are designated as control stations, a radio communication apparatus, optimum as a control station, works as the control station according to the connection state of a radio network without constructing several radio networks undesired by the user.

According to the radio network system employing the present invention, a new radio communication apparatus can freely enter into a radio network and a radio communication apparatus can freely withdraw from a radio network.

According to the radio communication apparatus employing the present invention, there can be realized a radio communication apparatus enabling the user to easily designate a control station by providing a switch means to preferentially become a control station of a radio network.

The invention claimed is:

1. A radio communication system that includes a radio network having a plurality of radio communication apparatuses, each one of the plurality of radio communication apparatuses being capable of operating as a control station of the radio network, and being capable of directly communicating with at least another of the plurality of radio communication apparatuses so that a given one of the plurality of radio communication apparatuses directly communicates with a particular portion of the plurality of radio communication apparatuses, said system comprising:

means for designating at least two of the plurality of radio communication apparatuses to be initial control stations; and each one of the plurality of radio communication apparatuses including:

means for receiving and storing a plurality of judgment values from the particular portion of the plurality of radio communication apparatuses that directly communicate with that radio communication apparatus such that a given one of the plurality of judgment values is received from and is associated with a specific one of the particular portion of the plurality of radio communication apparatuses, the given one of the plurality of judgment values indicating the number of radio communication apparatuses that directly communicate with the specific one of the particular portion of the plurality of radio communication apparatuses, means for determining the number of radio communication apparatuses in the particular portion of the plurality of radio communication apparatuses by counting each of the radio communication apparatuses from which its associated judgment value was received, means for generating a further one of the plurality of judgment values based on the number of radio communication apparatuses counted, the further one of the plurality of judgment values indicating the number of radio communication apparatuses that directly communicate with that radio communication apparatus, means for transmitting the further one of the plurality of judgment values to each one of the particular portion of the plurality of radio communication apparatuses, means for selecting, when that radio communication apparatus is one of the at least two initial control stations, that radio communication apparatus to be the working control station of said radio network when the further one of the plurality of judgment values is greater than each one of the received judgment values that are associated with all other ones of the at least two initial control stations whereby that radio communication apparatus directly communicates with a greater number of communication apparatuses than any other one of the at least two initial control stations, and means for transmitting, from that radio communication apparatus to each one of the particular portion of the plurality of radio communication apparatuses when said means for selecting selects that communication apparatus to be the working control station, notification that it is the working control station.

2. The radio communication system as set forth in claim 1, wherein each one of the plurality of radio communication apparatuses includes associated switch means for designating that radio communication apparatus as one of the at least two initial control stations of the radio network.

3. The radio communication system as set forth in claim 1, wherein said means for receiving and storing, said means for determining, said means for generating, and said means for transmitting the further one of the plurality of judgment values each carry out at least two iterations before said means for selecting selects the working control station.

4. A radio communication apparatus for a radio network that includes a plurality of radio communication apparatuses, said radio communication apparatus comprising:

means for receiving and storing a plurality of judgment values from a particular portion of the plurality of radio communication apparatuses that directly communicate with said radio communication apparatus such that a given one of the plurality of judgment values is received from and is associated with a specific one of the particular portion of the plurality of radio communication apparatuses, the given one of the plurality of judgment values indicating the number of radio communication apparatuses that directly communicate with the specific one of the particular portion of the plurality of radio communication apparatuses;

means for determining the number of radio communication apparatuses in the particular portion of the plurality of other radio communication apparatuses by counting each of the radio communication apparatuses from which its associated judgment value was received;

means for generating a further one of the plurality of judgment values based on the number of radio communication apparatuses counted, the further one of the plurality of judgment values indicating the number of radio communication apparatuses that directly communicate with said radio communication apparatus;

means for transmitting the further one of the plurality of judgment values to each one of the particular portion of the plurality of radio communication apparatuses;

means for selecting said radio communication apparatus to be the working control station of the radio network when the further one of the plurality of judgment values is greater than each received one of the plurality of judgment values whereby said radio communication apparatus directly communicates with a greater number of communication apparatuses than any other one of the particular portion of the plurality of radio apparatuses; and means for transmitting, from that radio communication apparatus to each one of the particular portion of the plurality of radio communication apparatuses when said means for selecting selects said radio communication apparatus as the working control station, notification that said radio communication apparatus is the working control station.

5. The radio communication apparatus as set forth in claim 4, wherein said radio communication apparatus further comprises switch means for designating said radio communication apparatus as the working control station of the radio network.

6. A method of radio communication, comprising:

constructing a radio network from a plurality of radio communication apparatuses, each one of the plurality of radio communication apparatuses being capable of directly communicating with at least another of the plurality of radio communication apparatuses so that a given one of the plurality of radio communication apparatuses directly communicates with a particular portion of the plurality of radio communication apparatuses;

for each one of the plurality of radio communication apparatuses:

receiving and storing a plurality of judgment values from the particular portion of the plurality of radio communication apparatuses that directly communicate with that radio communication apparatus such that a given one of the plurality of judgment values is received from and is associated with a specific one of the particular portion of the plurality of radio communication apparatuses, the given one of the plurality of judgment values indicating the number of radio communication apparatuses that directly communicate with the specific one of the particular portion of the plurality of radio communication apparatuses, determining the number of radio communication apparatuses in the particular portion of the plurality of radio communication apparatuses by counting each of the radio communication apparatuses from which its associated judgment value was received, generating a further one of the plurality of judgment values based on the number of radio communication apparatuses counted, the further one of the plurality of judgment values indicating the number of radio communication apparatuses that directly communicate with that radio communication apparatus, transmitting the further one of the plurality of judgment values to each one of the particular portion of the plurality of radio communication apparatuses, and selecting that radio communication apparatus to be the working control station for the radio network when the further one of the plurality of judgment values is greater than each received one of the plurality of judgment values whereby that radio communication apparatus directly communicates with a greater number of communication apparatuses than the other ones of the particular portion of the plurality of radio communication apparatuses; and transmitting, from the selected one of the plurality of radio communication apparatuses to its particular portion of the plurality of radio communication apparatuses, notification that it is the working control station.

7. A method of constructing a radio network comprised of a plurality of radio communication apparatuses that can each operate as a control station, each one of the plurality of radio communication apparatuses being capable of directly communicating with at least another of the plurality of radio communication apparatuses so that a given one of the plurality of radio communication apparatuses directly communicates with a particular portion of the plurality of radio communication apparatuses, said method comprising:

designating one of the plurality of radio communication apparatuses as an initial control station of the radio network;

for each one of the plurality of radio communication apparatuses:

receiving and storing a plurality of judgment values from the particular portion of the plurality of radio communication apparatuses that directly communicate with that radio communication apparatus such that a given one of the plurality of judgment values is received from and is associated with a specific one of the particular portion of the plurality of radio communication apparatuses, the given one of the plurality of judgment values indicating the number of radio communication apparatuses that directly communicate with the specific one of the particular portion of the plurality of radio communication apparatuses, determining the number of radio communication apparatuses in the particular portion of the plurality of radio communication apparatuses by counting each of the radio communication apparatuses from which its associated judgment value was received, generating a further one of the plurality of judgment values based on the number of radio communication apparatuses counted, the further one of the plurality of judgment values indicating the number of radio communication apparatuses that directly communicate with that radio communication apparatus, transmitting the further one of the plurality of judgment values to each one of the particular portion of the plurality of radio communication apparatuses, and selecting that radio communication apparatus to be the working control station for the radio network when the further one of the plurality of judgment values is greater than each received one of the plurality of judgment values whereby indicating that that radio communication apparatus directly communicates with a greater number of communication apparatuses than the other ones of the particular portion of the plurality of radio communication apparatuses; and transmitting, from the selected one of the plurality of radio communication apparatuses to its particular portion of the plurality of radio communication apparatuses, notification that it is the working control station.

8. The method of constructing a radio network as set forth in claim 7, wherein each one of the plurality of radio communication apparatuses includes an associated switch which enables that radio communication apparatus to become the working control station of the radio network.

9. The method of constructing a radio network as set forth in claim 7, wherein said receiving and storing step, said determining step, said generating step, and said transmitting the further one of the plurality of judgment values step are each performed at least two times prior to carrying out said selecting step.

10. A method of constructing a radio network that includes a plurality of radio communication apparatuses, each one of the plurality of radio communication apparatuses being capable of directly communicating with at least another of the plurality of radio communication apparatuses so that a given one of the plurality of radio communication apparatuses directly communicates with a particular portion of the plurality of radio communication apparatuses, said method comprising:

designating at least two of the plurality of radio communication apparatuses to be initial control stations;

for each one of the plurality of radio communication apparatuses:

receiving and storing a plurality of judgment values from the particular portion of the plurality of radio communication apparatuses that directly communicate with that radio communication apparatus such that a given one of the plurality of judgment values is received from and is associated with a specific one of the particular portion of the plurality of radio communication apparatuses, the given one of the plurality of judgment values indicating the number of radio communication apparatuses that directly communicate with the specific one of the particular portion of the plurality of radio communication apparatuses, determining the number of radio communication apparatuses in the particular portion of the plurality of radio communication apparatuses by counting each of the radio communication apparatuses from which its associated judgment value was received, generating a further one of the plurality of judgment values based on the number of radio communication apparatuses counted, the further one of the plurality of judgment values thereby indicating the number of radio communication apparatuses that directly communicate with that radio communication apparatus, transmitting the further one of the plurality of judgment values to each one of the particular portion of the plurality of radio communication apparatuses, and when that radio communication apparatus is one of the at least two initial control stations, selecting that radio communication apparatus to be the working control station for said radio network when the further one of the plurality of judgment values is greater than each one of the received judgment values that are associated with all other ones of the at least two initial control stations whereby that radio communication apparatus directly communicates with a greater number of communication apparatuses than the other ones of the at least two initial control stations; and transmitting, from the selected one of the at least two initial control stations to its particular portion of the plurality of radio communication apparatuses, notification that it is the working control station.

11. The method of constructing a radio network as set forth in claim 10, wherein said receiving and storing step, said determining step, said generating step, and said transmitting the further one of the plurality of judgment values step are each performed at least two times prior to carrying out said selecting step.

* * * * *